(12) United States Patent
Süppel-Adrian et al.

(10) Patent No.: US 7,652,756 B2
(45) Date of Patent: Jan. 26, 2010

(54) METHOD AND APPARATUS FOR CENTERING AN OPHTHALMIC LENS

(75) Inventors: Christian Süppel-Adrian, Klingenberg (DE); Fabian Kern, Grosswallstadt (DE); Michael Wolf, Darmstadt (DE); Peter Hagmann, Erlenbach am Main (DE)

(73) Assignee: Novartis AG, Basel (CH)

( * ) Notice: Subject to any disclaimer, the term of this patent is extended or adjusted under 35 U.S.C. 154(b) by 175 days.

(21) Appl. No.: 11/989,364

(22) PCT Filed: Jul. 27, 2006

(86) PCT No.: PCT/EP2006/007456
§ 371 (c)(1),
(2), (4) Date: Jan. 23, 2008

(87) PCT Pub. No.: WO2007/017138
PCT Pub. Date: Feb. 15, 2007

(65) Prior Publication Data
US 2009/0231576 A1    Sep. 17, 2009

(30) Foreign Application Priority Data
Jul. 29, 2005    (EP) .................................. 05016546

(51) Int. Cl.
*G01N 1/00* (2006.01)
*G01N 1/10* (2006.01)

(52) U.S. Cl. ........................................ 356/36; 356/246
(58) Field of Classification Search .................. 356/36, 356/246
See application file for complete search history.

(56) References Cited

U.S. PATENT DOCUMENTS

2005/0197604 A1*    9/2005    Heilman ..................... 601/160

FOREIGN PATENT DOCUMENTS

| GB | 2 056 702 A | 3/1981 |
| GB | 2 093 605 A | 9/1982 |
| WO | WO 03/016855 A1 | 2/2003 |

OTHER PUBLICATIONS

International Search Report, Feb. 15, 2007.
Written Opinion of the International Searching Authority, Jan. 29, 2008.

* cited by examiner

*Primary Examiner*—Roy Punnoose
(74) *Attorney, Agent, or Firm*—Robert Ambrose (57) ABSTRACT

An ophthalmic lens, e.g. a contact lens, is centered in a concave trough (10) of an inspection cell (1) which is filled with liquid (W). The inspection cell (10) has a channel (11) which is in communication with the concave trough (10). Centering of the ophthalmic lens is achieved by applying a pulse (P) of a fluid to the liquid (W) so as to whirl up the ophthalmic lens (CL) and by allowing the ophthalmic lens (CL) to settle down in the center of the concave trough (10).

10 Claims, 7 Drawing Sheets

METHOD AND APPARATUS FOR CENTERING AN OPHTHALMIC LENS

The present invention deals with a method and an apparatus for centering an ophthalmic lens in a concave trough of an inspection cell. In a further aspect, the present invention also deals with a method and an apparatus for removing an ophthalmic lens from a concave trough of an inspection cell.

Contact lenses which are worn only once and are then disposed of are known to be produced in a highly automated production process with the aid of reusable molds. In order to ensure that the quality of the lenses remains constantly at a very high level, the contact lenses produced are optically inspected. However, in particular soft contact lenses are difficult to handle using mechanical means, and accordingly it has been suggested to insert the soft contact lenses into a water bath where they are optically inspected. It has been found that a contact lens, when inserted into a water bath, always orients itself with the concave surface facing upwards. This property is made use of in optical inspection of the lenses.

An inspection cell that can be used for the optical inspection of a contact lens in a water bath has been suggested in WO 03/016855. The inspection cell has the form of a cuvette having a concave trough for accommodating the contact lens to be inspected, and a channel being in communication with the concave trough. The cuvette is filled with a liquid, e.g. water. The cuvette can be swiveled between a handling position, in which the contact lens can be inserted into the liquid through the channel or removed from the concave trough through the channel, and an inspection position, in which the contact lens is inspected. In the inspection position, the contact lens is inspected through a viewing glass of the cuvette. The amount of liquid in the cuvette is chosen such, that during inspection the underside of the viewing glass is fully immersed in the liquid so that no bubbles can be formed between the liquid and the viewing glass, thus reliably avoiding any influencing of the optical system by bubbles or free boundary surfaces.

To inspect a contact lens, the contact lens is first inserted through the channel into the liquid. It is then allowed to orient itself and settle down in the concave trough. The contact lens automatically settles down in a centered position in the concave trough. For inspection, the cuvette is swiveled to the inspection position thus causing the lens to move from the center of the concave trough to a continuation of the concave trough, which continuation can form a part of an optical lens through which the contact lens can be inspected. Once the inspection of the lens has been completed, the cuvette is swiveled back to the handling position, thus causing the lens to move back towards the center of the concave trough. However, this swiveling back of the cuvette does not in all cases result in the contact lens being centered again in the concave trough.

On the other hand, centering of the contact lens in the concave trough of the cuvette is important for the further handling of the contact lens. For example, once inspection of the contact lens has been completed it is typically removed from the concave trough by means of a gripper, as this is also disclosed in WO 03/016855. However, such a gripper may comprise a gripper head with an attachment surface being provided with specifically arranged holes through which suction may be applied to make the lens adhere to the attachment surface of the gripper head. To remove the lens, the gripper head is lowered through the channel until it reaches the contact lens. Suction is then applied, and the gripper with the lens adhering to the attachment surface is then raised again through the channel. The lens adhering to the attachment surface of the gripper can then be transported by moving the gripper to a further station in the manufacturing process. For example, the lens can be transported to a package having a concave bowl into the center of which the contact lens is then laid down.

As already mentioned, it may occur that the contact lens to be removed from the cuvette is not properly centered in the concave trough of the cuvette after swiveling back the cuvette from the inspection position to the handling position. As the gripper is then lowered towards the center of the concave trough (where the contact lens should rest) and the contact lens is arranged off-center, application of suction through the holes may result in water being drawn in through holes not covered by the contact lens into the suction channel of the gripper and further into the vacuum source generating the suction. The vacuum source must then be cleaned, or even worse the water drawn in may be detrimental to the vacuum source, or more expensive vacuum sources must be used having a water separator. In addition, due to the contact lens not being attached to the gripper head in a centered position, the contact lens cannot be properly laid down into the center of the concave bowl of the package, which is desirable to keep the overall volume of the package small and to avoid damaging of the lens during sealing of the package with a foil.

Accordingly, it is an objective of the instant invention to overcome the aforementioned disadvantages of the prior art.

This objective is achieved by a method for centering an ophthalmic lens, e.g. a contact lens, in a concave trough of an inspection cell, as it is characterized by the features of independent claim 1, and by an apparatus for centering an ophthalmic lens, e.g. a contact lens, in the concave trough of an inspection cell, as it is characterized by the features of independent claim 6. Advantageous embodiments of the method and apparatus are the subject of the respective dependent claims. A further aspect of the invention relates to a method and an apparatus for the removal of an ophthalmic lens from the concave trough of an inspection cell, as they are characterized by the features of claims 4, 5 or 10.

In particular, the method according to the invention comprises the steps of applying a pulse of a fluid to the liquid so as to whirl up the ophthalmic lens allowing the ophthalmic lens to settle down in the center of the concave trough.

The first step causes the off-centered lens to be whirled up, so that the lens leaves its off-centered position. After the pulse of fluid has been applied and the lens has been whirled up, the lens is allowed to settle down again. The settling down of the lens automatically occurs such that the lens settles down in the center of the concave trough, similar to what happens when the lens is introduced into the liquid in the inspection cell, e.g. a cuvette, prior to its inspection. The step of applying a pulse of a fluid to the liquid contained in the inspection cell generates only little expense from a technical point of view and the settling down of the lens occurs automatically, thus providing a simple solution to the problem of off-centered lenses.

In a variant of the method according to the invention both the liquid contained in the inspection cell and the fluid applied to the liquid (contained in the inspection cell) in the form of a pulse are water. While it is in general conceivable that the fluid to be applied in form of a pulse could be a gaseous pulse, a liquid is preferred. Since a preferred liquid contained in the inspection cell is water, the liquid applied in form of a pulse is also water.

In a further variant of the method according to the instant invention, the pulse of fluid is applied to the surface of the liquid contained in the channel. While it is in general conceivable that the pulse may be applied to the liquid at a location below the surface of the liquid, it is technically less expensive to provide a means (e.g. the open end of a capillary tube) which is arranged above the surface of the liquid contained in the inspection cell and which ejects a pulse of fluid, e.g. water, that impinges on the surface of the liquid.

As already indicated above, a further aspect of the invention relates to a method for removing an ophthalmic lens, e.g. a contact lens, from an inspection cell which is filled with liquid, through a channel of the cell which is in communication with the concave trough. The method comprises in particular the steps of centering the ophthalmic lens in the concave trough
  lowering a gripper towards the center of the concave trough until the gripper reaches the ophthalmic lens
  gripping the ophthalmic lens, and
  removing the gripped ophthalmic lens from the inspection cell by raising the gripper with the gripped contact lens through the channel, wherein the step of centering the ophthalmic lens in the concave trough is performed by a method as described hereinbefore.

This method allows to remove the ophthalmic lens from a centered position and to transfer it to another location with the lens adhering to the gripper in a centered position. In particular, it is thus possible to transfer the lens to a package and to lay it down into the center of a concave bowl of the package, which allows to use packages with minimum overall volume.

In a preferred variant of the method, the step of gripping the ophthalmic lens is performed by applying suction trough holes provided in an attachment surface of the gripper head thus causing the ophthalmic lens to be attached to the gripper head. This is a reliable manner to remove ophthalmic lenses, e.g. contact lenses, from an inspection cell, since it is possible to use the afore-described well-known grippers as long as it ensured that the lenses are indeed positioned in the center of the concave trough at the time they are to be removed.

With respect to the apparatus according to the invention, the apparatus for centering the ophthalmic lens, e.g. a contact lens, in the concave trough of an inspection cell which is filled with liquid comprises means for applying a pulse of fluid to the liquid so as to whirl up the ophthalmic lens and to then allow it to settle down in the center of the concave trough.

In one embodiment of the apparatus, the means for applying the pulse of fluid to the liquid contained in the inspection cell comprise at least one capillary tube, the outlet end of which is arranged at a position above a set position of the channel of the inspection cell and facing towards the channel. The use of a capillary tube is particularly advantageous inasmuch as once the pulse of liquid has been ejected through the end of the capillary tube, the capillary tube generates a "sucking" effect such that no droplets may rest at the outlet end of the capillary tube and may unintentionally fall down onto the inspection cell, e.g. the cuvette. Such unintentionally falling down droplets may otherwise contaminate the inspection cell, in particular the optics (e.g. the viewing glass) of the inspection cell.

A further embodiment of the apparatus comprises a plurality of capillary tubes the outlet ends of which are each arranged at a position above a respective set position of a corresponding plurality of inspection cells and facing towards the channel of the respective inspection cell, and further comprising a common feed conduit to which the inlet ends of the capillary tubes are connected. This allows to inspect, center and handle a plurality of ophthalmic lenses at a time, which is highly advantageous for the manufacturing of disposable lenses, since large numbers of lenses must be produced in a short time. The common feed conduit allows to only provide one single supply of fluid, e.g. water, to be connected to the feed conduit, which in turn supplies water to the various capillary tubes through their inlets ends connected to the conduit. This reduces the constructive expense of the apparatus.

In an embodiment of this apparatus, the ratio of the inner cross-section of the feed conduit to the inner cross-section of the outlet end of the capillary tube is at least 7:1, more preferably at least 10:1, and most preferably at least 20:1. In other words, the ratio of the inner cross-section of the feed-conduit to the inner cross-section of the outlet end of the capillary tube is high in order to achieve an even distribution of the flow and pressure to all of the capillary tubes connected to the feed conduit.

With respect to an apparatus for removing an ophthalmic lens, e.g. a contact lens, from an inspection cell which is filled with liquid, the apparatus in particular comprises an apparatus for centering the ophthalmic lens in the concave trough as described hereinbefore
  a gripper being arranged at a set position above the center of the concave trough, the gripper comprising a gripper head with holes being provided in an attachment surface of the gripper head
  means for lowering and raising the gripper towards and away from the center of the concave trough
  means for applying suction through the holes in the attachment surface of the gripper head.

Further advantageous aspects of the instant invention will become apparent from the following detailed description of embodiments of the method and apparatus of the invention with the aid of the drawings in which.

Figure 1:
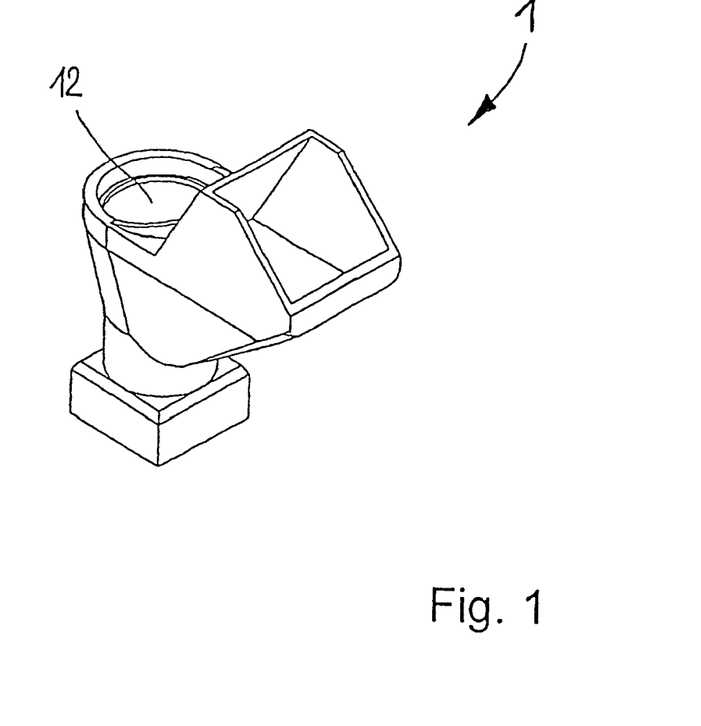
FIG. 1 shows a perspective view of an embodiment of an inspection cell in form of a cuvette
Figure 2:
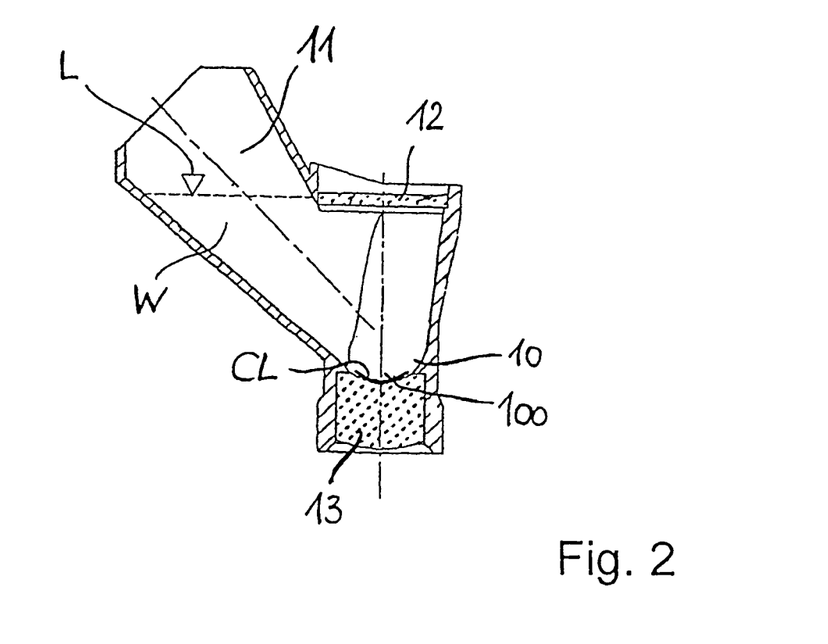
FIG. 2 shows a cross-sectional view of the cuvette of FIG. 1 in the inspection position

In FIG. 1 an embodiment of an inspection cell in form of a cuvette 1, as it is known, for example, from WO 01/016855 is shown in perspective view while FIG. 2 shows the inspection cell 1 in cross-sectional view in the inspection position. Cuvette 1 comprises a concave trough 10 having a continuation 100 and a channel 11 in communication with concave trough 10. A viewing glass 12 is provided through which inspection of the lens, e.g. a contact lens CL, can be performed. Continuation 100 of concave trough 10 is formed in the embodiment shown by an optical element 13 such as a lens, through which contact lens CL can be inspected in transmission.

As can be seen from FIG. 2, cuvette 1 is filled with liquid W, e.g. water, to a level L such that the level L of liquid W is above the underside of viewing glass 12, i.e. the underside of viewing glass 12 is fully immersed in the liquid W, so as to make sure that no bubbles can be formed between the liquid W and the underside of viewing glass 12 and that no boundary surfaces exist. Thus, the optical inspection is not influenced by bubbles or boundary surfaces.

Figure 3:
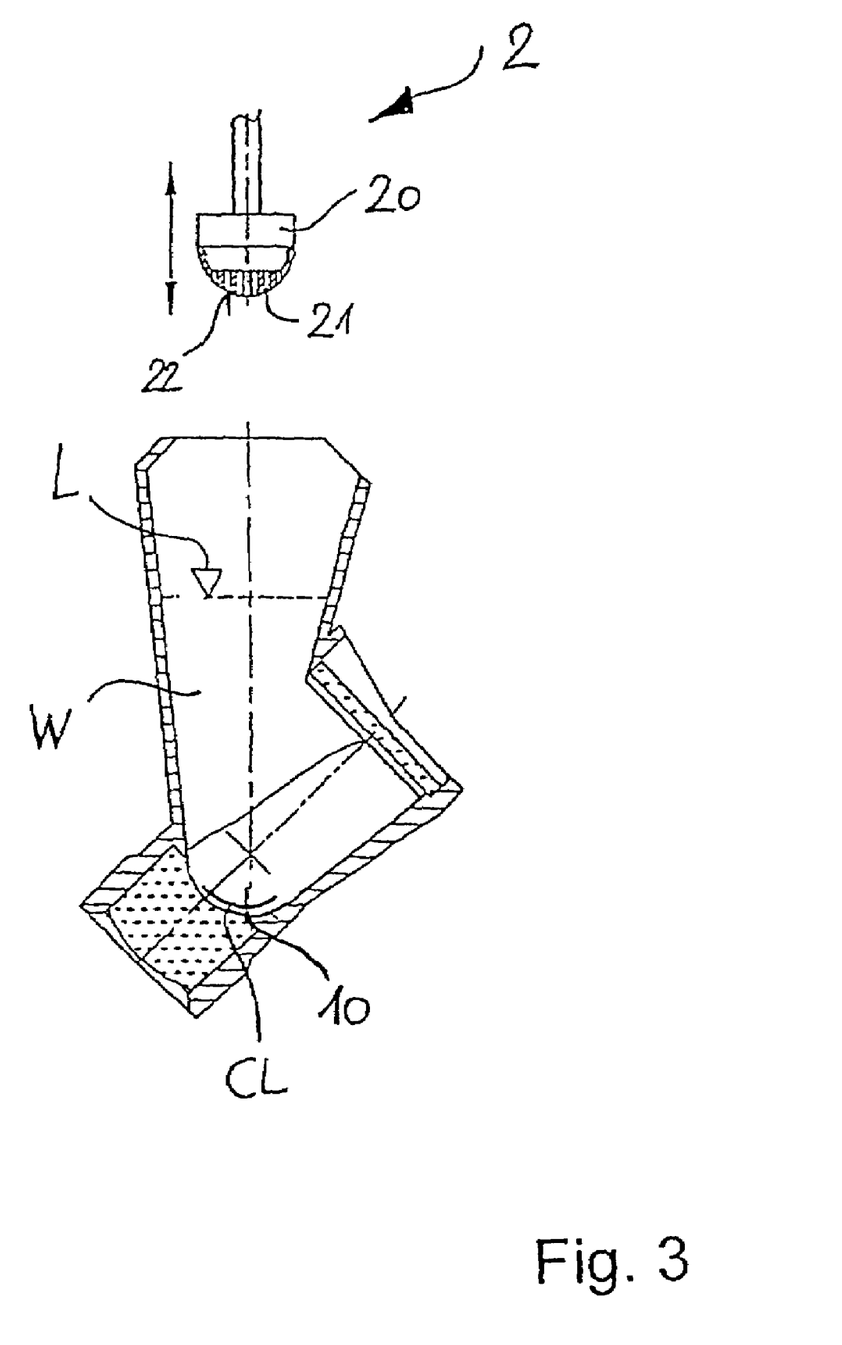
FIG. 3 shows a cross-sectional view of the cuvette of FIG. 1 in the handling position, with the contact lens in the concave trough being arranged in an off-center position

Once inspection of the contact lens CL is completed, cuvette 1 is swiveled from the inspection position to the handling position, as this is shown in FIG. 3. Also, a gripper 2 is shown comprising a gripper head 20 having holes 21 in its attachment surface 22. In order to grasp the contact lens during removal of the contact lens CL from cuvette 1, the gripper 2 is lowered through channel 11 of cuvette 1 until gripper head 20 reaches contact lens CL. Suction is then applied through holes 21 in order to make the contact lens adhere to attachment surface 22. Once contact lens CL adheres securely to attachment surface 22, gripper 2 is raised with contact lens CL being attached to attachment surface 22 of gripper head 20.

As can be seen in FIG. 3, after swiveling cuvette 1 from the inspection position (FIG. 2) to the handling position (FIG. 3), contact lens CL may be slightly misplaced, i.e. it may be arranged slightly off-center. Since gripper head 20 is positioned accurately above the center of concave trough 10 of cuvette 1, lowering gripper 2 until gripper head 20 reaches contact lens CL and subsequently applying suction through holes 21 would result in liquid W being drawn in into the suction channel of gripper 2 and into the vacuum source (not shown) generating the suction. While such drawing in of liquid at best results in the need of cleaning the vacuum source, it may also have detrimental effects on the vacuum source, or a more expensive vacuum source having a water separator must be used so as to avoid damage to the vacuum source.

Figure 4:
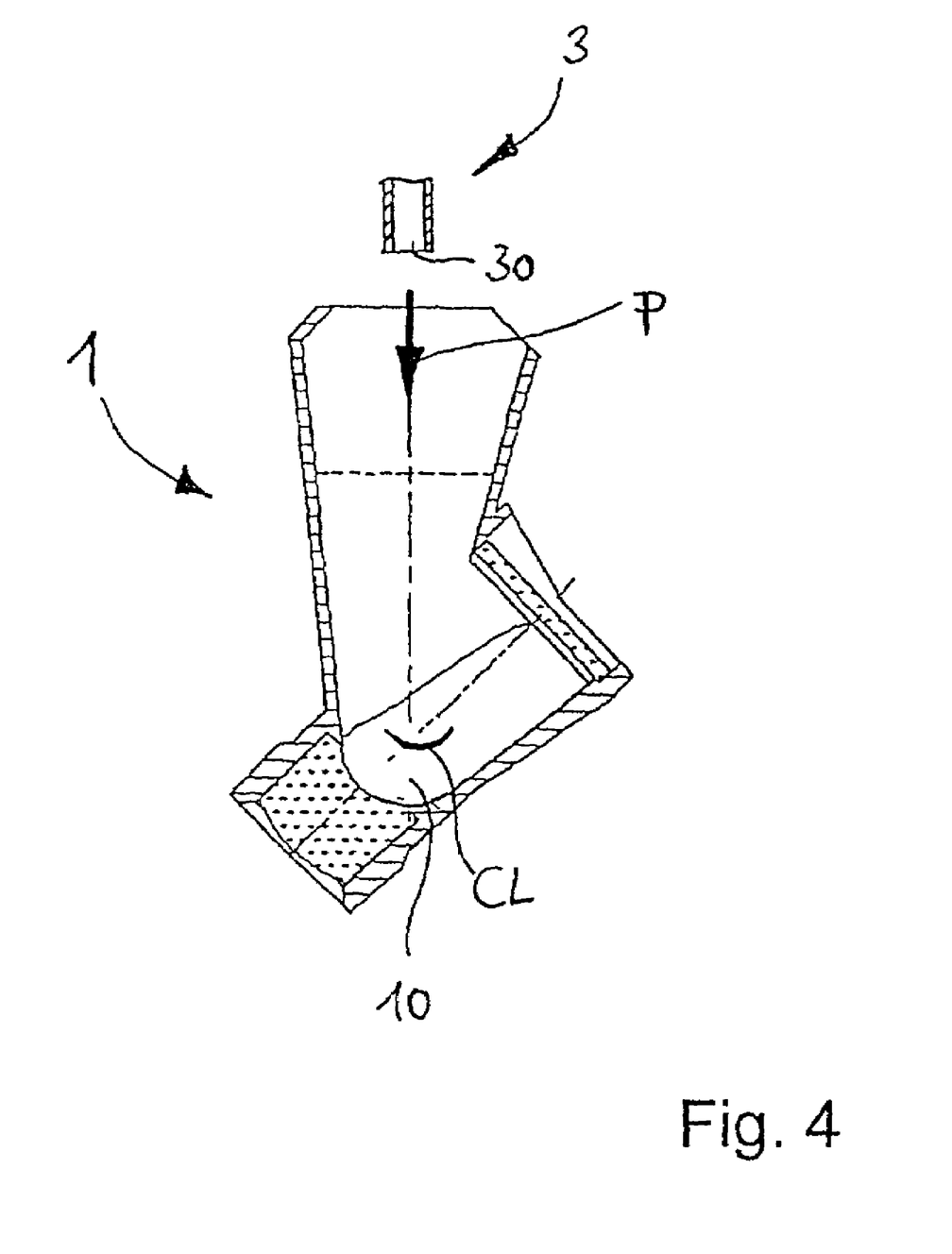
FIG. 4 shows a cross-sectional view of the cuvette of FIG. 1 in the handling position after application of a pulse of fluid, with the contact lens being in a whirled up state
Figure 5:
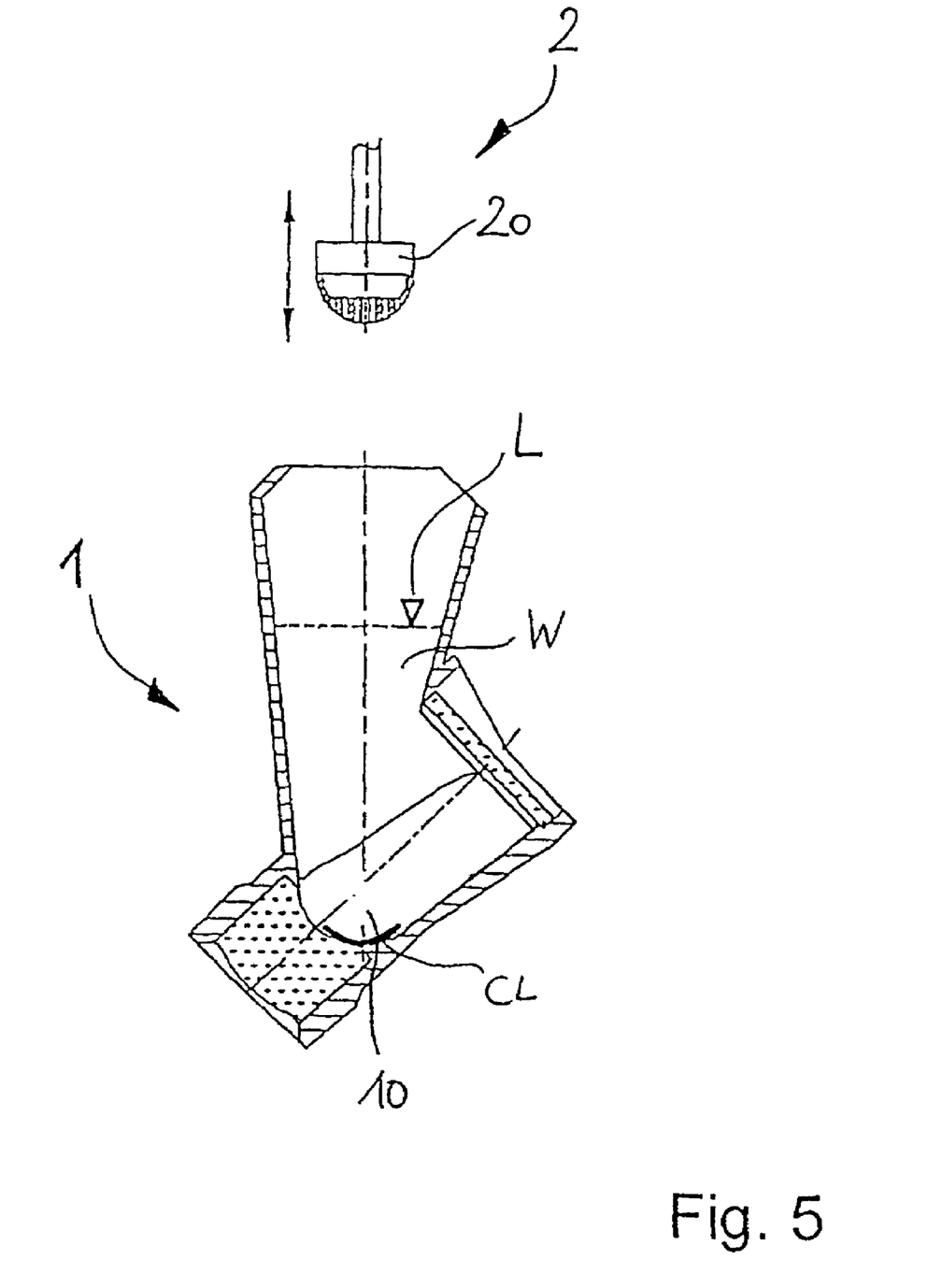
FIG. 5 shows a cross-sectional view of the cuvette of FIG. 1 in the handling position after the contact lens has settled down in a centered position in the concave trough

According to the invention, it is suggested to apply a fluid pulse, e.g. a pulse of water, to the liquid and to allow contact lens CL to settle down again. This causes contact lens CL to be whirled up, as this is shown in FIG. 4. The fluid pulse P—represented by an arrow in FIG. 4—may be applied through the outlet end 30 of a capillary tube 3. After having applied the fluid pulse P (see FIG. 4), contact lens CL settles down automatically in the center of concave trough 10, as this is shown in FIG. 5. Removal of contact lens CL from cuvette 1 can then be performed as this has been described above.

Figure 6:
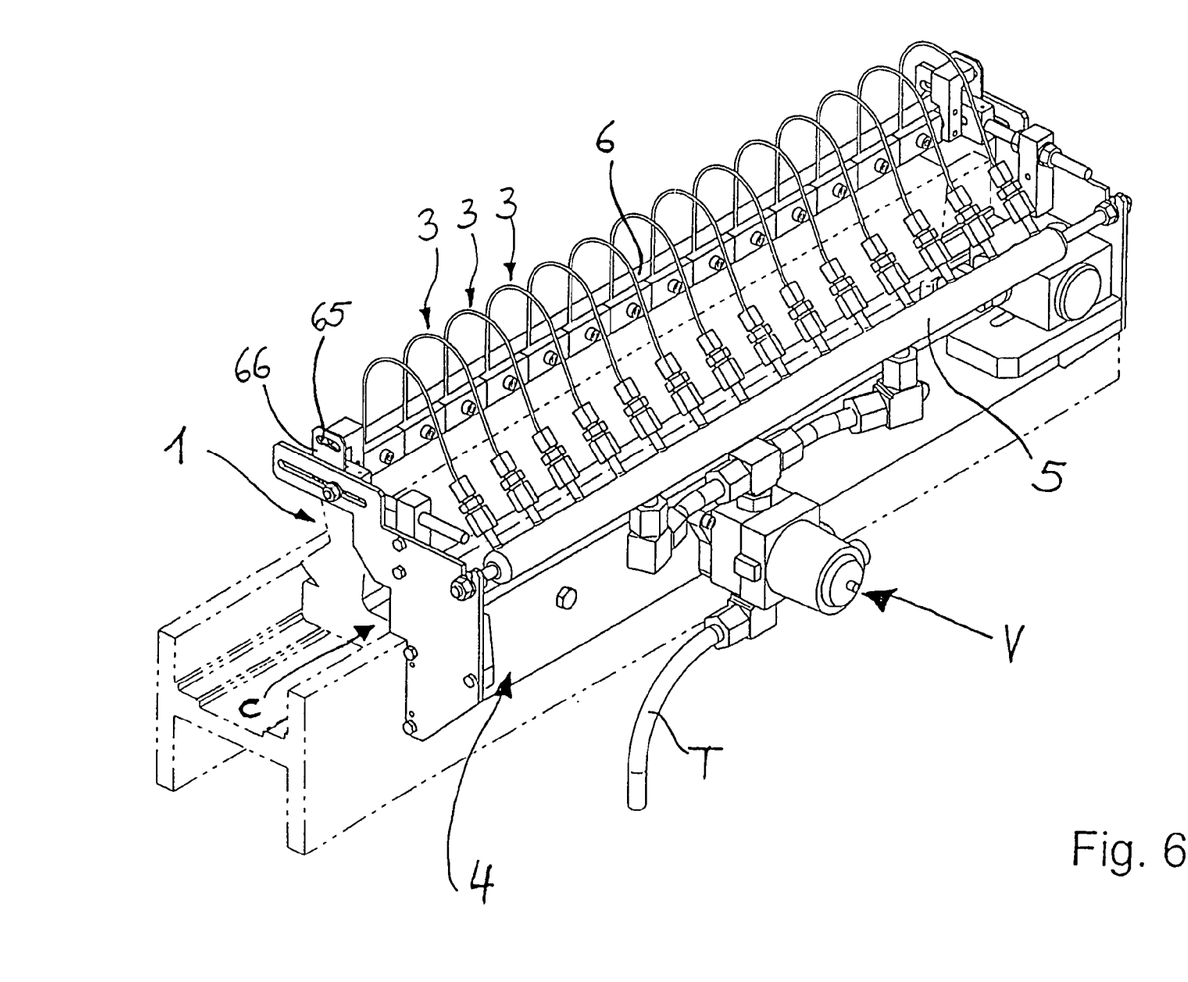
FIG. 6 shows a perspective view of an embodiment of an apparatus for centering contact lenses in the concave trough of an inspection cell such as the cuvette shown in FIG. 1 in accordance with the invention
Figure 7:
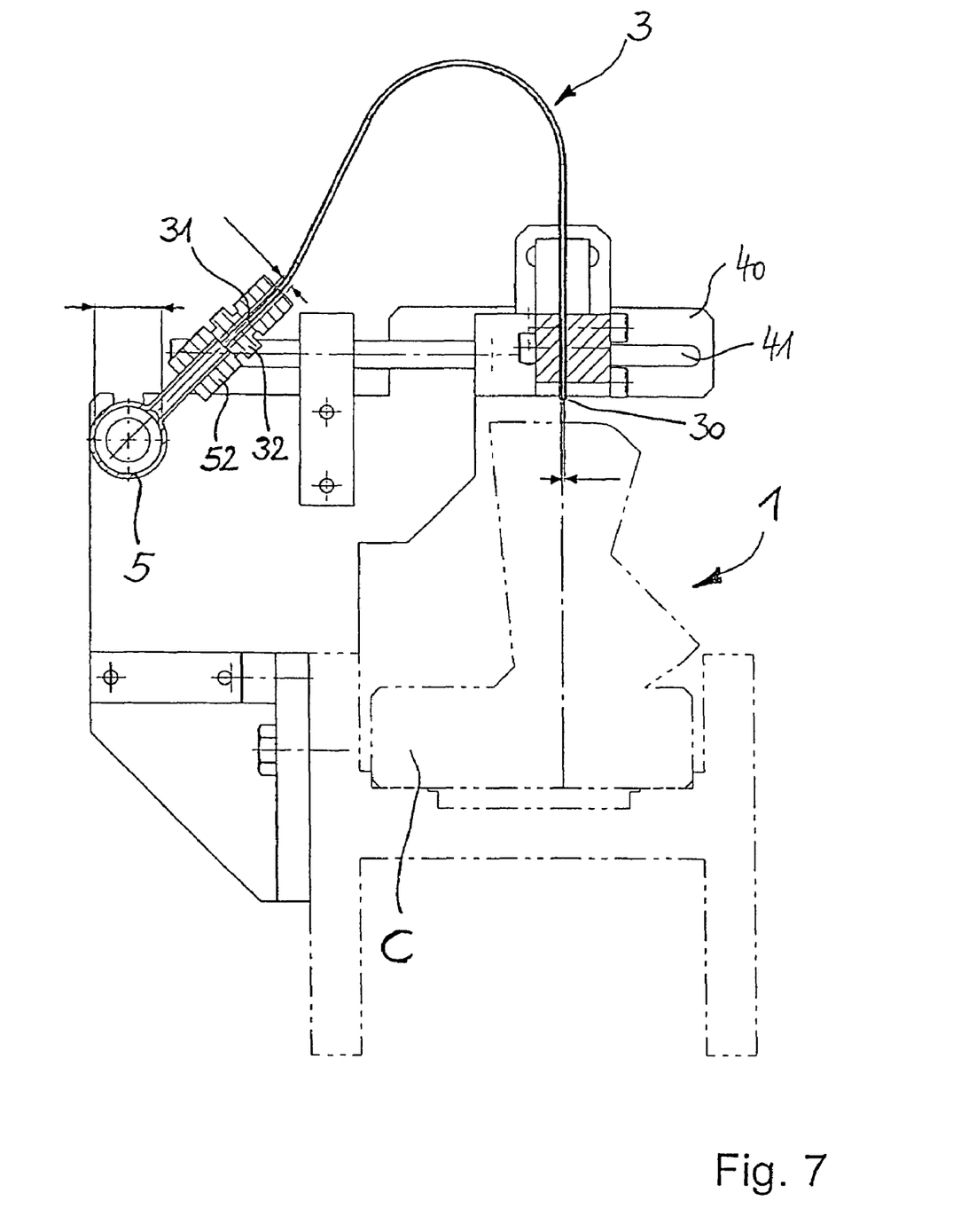
FIG. 7 shows a cross-sectional view of the embodiment of the apparatus of FIG. 6.

FIG. 6 shows an embodiment of the apparatus according to the invention. The apparatus comprises a plurality of capillary tubes 3, the outlet ends 30 of which are arranged in a set position above the center of a corresponding plurality of cuvettes 1, as this is shown in FIG. 7. The inlet ends 31 of the capillary tubes 3 are arranged in respective mounting elements 32 (see FIG. 6) which are accommodated by corresponding mounting elements 52 protruding from a common feed conduit 5. The outlet ends 30 of capillary tubes 3 are mounted to a mounting bar 6. A plurality of cuvettes 1 can be mounted to a respective carrier C. Feed conduit 5 is supplied with liquid (e.g. water) through a tube T. A valve V is arranged between tube T and feed conduit 5.

At the very beginning feed conduit 5 as well as capillary tubes 3 have to be completely filled with liquid (initialization). After initialization, the apparatus works as follows: At the time the carrier C carrying the cuvettes has reached its set position, that is to say at the time the cuvettes are arranged under the outlet ends 30 of capillary tubes 3 as shown in FIG. 7, valve V (FIG. 6) is opened for a short predetermined period of time, thus allowing pressurized fluid supplied through tube T to enter feed conduit 5. The supply of pressurized fluid presses a part of the fluid contained in feed conduit 5 into capillary tubes 3 which in turn causes fluid contained in capillary tubes 3 to be ejected through the outlet end thus generating the fluid pulse P (see FIG. 4) causing contact lens CL to be whirled up. After the predetermined period of time is over, valve V is closed again and, accordingly, no more fluid exits through outlet ends 30 of capillary tubes 3. The carrier C can then be moved to the next handling station, where a gripper can remove the contact lens CL from the centered position in the cuvette 1 (to which it has settled down, see FIG. 5), as has already been described hereinbefore.

Figure 8:
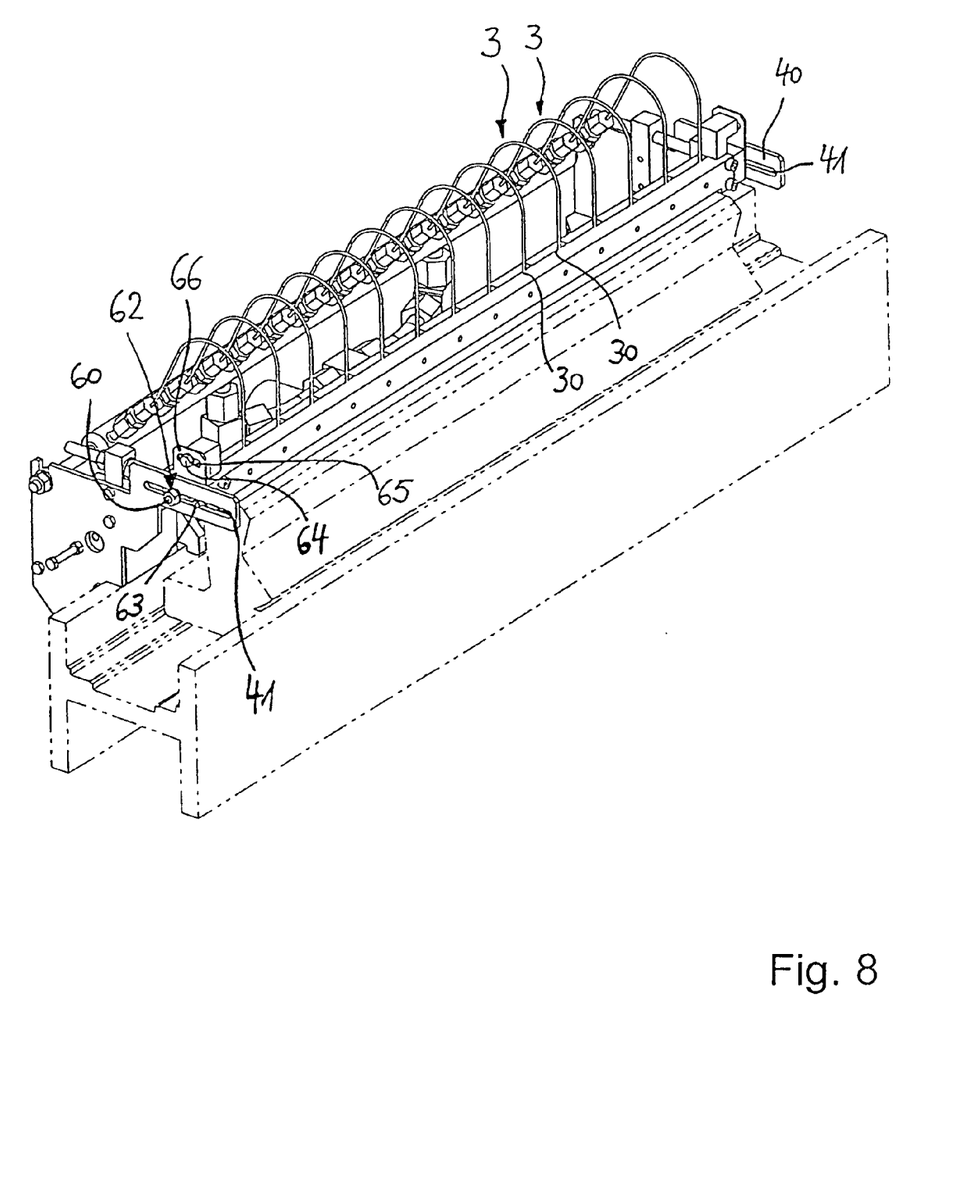
FIG. 8 shows another perspective view of the embodiment of the apparatus of FIG. 7.

The position of the outlet ends 30 of capillary tubes 3 relative to cuvettes 1 can be adjusted. For that purpose, mounting bar 6 is provided at each of its lateral ends with a first threaded pin 60, as can be seen in FIG. 8, for allowing translatory movement (horizontal movement) of mounting bar 6 within slots 41 provided in lateral mounting flanges 40 (see also FIG. 7) of a mounting base 4 (see FIG. 6). Mounting bar 6 can be secured to flanges 40 with the aid of corresponding nuts 62 in order to fix its horizontal positional arrangement. Mounting bar 6 is further provided at each of its lateral ends with a pivot pin 63, about which mounting bar 6 can be pivoted in order to change the angle of the outlet end 30 of the capillary tubes 3 relative to the cuvettes 1. For example, it may be desirable to arrange the outlet ends in an angular orientation such that the pulse P (see FIG. 4) is applied to the liquid in the cuvettes under an angle other than 90°. For securing mounting bar in the desired angular orientation, mounting bar 6 further comprises at each of its lateral ends a fixation pin 64 which is guided in a curved slot 65 of a flange 66 (see also FIG. 6).

With regard to the area of the inner cross-section of feed tube 5—represented by diameter D shown in FIG. 7—relative to the area of cross-section of capillary tube 3—represented by diameter d shown in FIG. 7—it is preferred that this ratio be large. Preferably, this ratio is at least 7:1, more preferably at least 10:1, and most preferably at least 20:1. The pressurized liquid (e.g. water) supplied through tube T may, for example, be in the range between 2 bar to 3 bar, but can be adapted to the specific needs. The duration of a pulse P of liquid can be comparatively short, and may particularly be in the range of some hundred milliseconds. This is important inasmuch as the cycle time of a clock-cycled, highly automated manufacturing process is to be kept short in order to ensure a highly efficient manufacturing of contact lenses.

While specific embodiments of the process and apparatus have been described by way of example, these embodiments are not intended to limit the scope of protection which is defined through the appended claims.

The invention claimed is:

1. Method for centering an ophthalmic lens, in a concave trough of an inspection cell which is filled with liquid, the inspection cell having a channel which is in communication with the concave trough, the method comprising:
   applying a pulse of a fluid to the liquid so as to whirl up the ophthalmic lens; and
   allowing the ophthalmic lens to settle down in the center of the concave trough.

2. Method according to claim 1, wherein both the liquid contained in the inspection cell and the fluid applied to the liquid in the form of a pulse are water.

3. Method according to claim 1, wherein the pulse of fluid is applied to the surface of the liquid contained in the channel.

4. Method for removing an ophthalmic lens, e.g. a contact lens, from an inspection cell which is filled with liquid, through a channel of the cell which is in communication with the concave trough, the method comprising:
   centering the ophthalmic lens in the concave trough;
   lowering a gripper towards the center of the concave trough until the
   gripper reaches the ophthalmic lens; gripping the ophthalmic lens; and
   removing the gripped ophthalmic lens from the inspection cell by raising the gripper with the gripped contact lens through the channel;
   wherein the step of centering the ophthalmic lens in the concave trough is performed by a method according to claim 1.

5. Method according to claim 4, wherein the step of gripping the ophthalmic lens is performed by applying suction through holes provided in an attachment surface of the gripper head thus causing the ophthalmic lens to be attached to the gripper head.

6. Apparatus for centering an ophthalmic lens, in the concave trough of an inspection cell which is filled with liquid and which has a channel being in communication with the concave trough, the apparatus comprising means for applying a pulse of fluid to the liquid so as to whirl up the ophthalmic lens and to then allow it to settle down in the center of the concave trough.

7. Apparatus according to claim 6, wherein the means for applying the pulse of fluid to the liquid contained in the inspection cell comprise at least one capillary tube, the outlet end of which is arranged at a position above a set position of the channel of the inspection cell and facing towards the channel.

8. Apparatus according to claim 6, comprising a plurality of capillary tubes the outlet ends of which are each arranged at a position above a respective set position of a corresponding plurality of inspection cells and facing towards the channel of the respective inspection cell, and further comprising a common feed conduit to which the inlet ends of the capillary tubes are connected.

9. Apparatus according to claim 8, wherein the ratio of the inner cross-section of the feed conduit to the inner cross-section of the outlet end of the capillary tube is at least 7:1, more preferably at least 10:1, and most preferably at least 20:1.

10. Apparatus for removing an ophthalmic lens from an inspection cell which is filled with liquid and which has a concave trough and a channel in communication with the concave trough, the apparatus comprising:
    an apparatus for centering the ophthalmic lens in the concave trough according to any one of claim 6;
    a gripper being arranged at a set position above the center of the concave trough, the gripper comprising a gripper head with holes being provided in an attachment surface of the gripper head;
    means for lowering and raising the gripper towards and away from the center of the concave trough;
    means for applying suction through the holes in the attachment surface of the gripper head.

\* \* \* \* \*